US009022863B2

(12) United States Patent
Ando et al.

(10) Patent No.: US 9,022,863 B2
(45) Date of Patent: May 5, 2015

(54) VIDEO GAME PROCESSING APPARATUS AND VIDEO GAME PROCESSING PROGRAM PRODUCT

(71) Applicant: Kabushiki Kaisha Square Enix, Tokyo (JP)

(72) Inventors: Takehiro Ando, Tokyo (JP); Hiroaki Iwano, Tokyo (JP); Akihide Hoshi, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 142 days.

(21) Appl. No.: 13/868,302

(22) Filed: Apr. 23, 2013

(65) Prior Publication Data

US 2013/0288794 A1 Oct. 31, 2013

(30) Foreign Application Priority Data

Apr. 27, 2012 (JP) .................................. 2012-103702

(51) Int. Cl.
| | |
|---|---|
| *A63F 9/24* | (2006.01) |
| *A63F 13/00* | (2014.01) |
| *G06F 17/00* | (2006.01) |
| *G06F 19/00* | (2011.01) |
| *A63F 13/98* | (2014.01) |

(Continued)

(52) U.S. Cl.
CPC ................. *A63F 13/02* (2013.01); *A63F 13/10* (2013.01); *A63F 13/69* (2014.09); *A63F 13/822* (2014.09); *A63F 13/44* (2014.09)

(58) Field of Classification Search
CPC ..................................... A63F 1/00; A63F 1/04
USPC ...................................................... 463/31, 11
See application file for complete search history.

(56) References Cited

U.S. PATENT DOCUMENTS

| 5,390,937 A | 2/1995 | Sakaguchi et al. |
| 5,649,862 A | 7/1997 | Sakaguchi et al. |

(Continued)

FOREIGN PATENT DOCUMENTS

| JP | 2794230 | 9/1998 |
| JP | 2005-319107 | 11/2005 |
| JP | 2010-017257 | 1/2010 |

OTHER PUBLICATIONS

Office Action from Japan Patent Office (JPO) in Japanese Patent Application No. 2012-103702, dated Oct. 15, 2013 along with an english translation thereof.

(Continued)

*Primary Examiner* — Kevin Y Kim
(74) *Attorney, Agent, or Firm* — Greenblum & Bernstein, P.L.C.

(57) ABSTRACT

A video game processing apparatus includes a virtual card information memory for storing virtual card information on virtual cards used for a fighting in a video game and a player information memory for storing player information. The virtual card information indicates the attack content and an attack condition. The player information contains setup virtual card information indicating a setup virtual card set up by the player as a virtual card used for the fighting. It is determined whether there is a setup virtual card whose attack condition is satisfied among the setup virtual cards on the basis of a time measured by a timer. In a case where there are plural setup virtual cards for which it is determined that their attack conditions are respectively satisfied within a predetermined time interval, bonus processing according to a combination of the plural setup virtual cards is carried out.

20 Claims, 7 Drawing Sheets

(51) Int. Cl.
*A63F 13/40* (2014.01)
*A63F 13/69* (2014.01)
*A63F 13/822* (2014.01)
*A63F 13/44* (2014.01)

(56) References Cited

U.S. PATENT DOCUMENTS

| | | | | |
|---|---|---|---|---|
| 5,662,332 | A * | 9/1997 | Garfield | 273/308 |
| 8,317,625 | B2 | 11/2012 | Saito et al. | |
| 8,523,648 | B2 * | 9/2013 | Gilson et al. | 463/11 |
| 2006/0068870 | A1 * | 3/2006 | Crawford et al. | 463/13 |
| 2013/0005490 | A1 | 1/2013 | Ooya | |
| 2013/0065654 | A1 | 3/2013 | Matsui et al. | |

OTHER PUBLICATIONS

"Dairenkei! Odin Battle [Warriors of Odin]", Weekly Famitsu the Dec. 22, 2011, Enterbrain Inc., vol. 26, No. 51 1201$^{st}$, pp. 233 (Dec. 8, 2011), together with a partial English language translation thereof.

"Genso Suikoden: Tsumugareshi Hyakunen no Toki", Dengeki Playstation the Feb. 23, 2012, ASCII Media Works Inc., vol. 18, No. 7 584$^{th}$, pp. 33 (Feb. 9, 2012), together with a partial English language translation thereof.

* cited by examiner

Fig. 2

VIRTUAL CARD INFORMATION

| CARD NUMBER | CARD NAME | RARITY | ACTION CONTENT | | DEFENSIVE POWER | CARD COST | SPEED |
|---|---|---|---|---|---|---|---|
| | | | OFFENSIVE POWER | ATTACK REPRESENTATION INFORMATION | | | |
| C0001 | xxxx | NORMAL | 100 | ..... | 100 | 2 | A (2 SEC.) |
| C0002 | xxxx | NORMAL | 200 | ..... | 200 | 2 | B (4 SEC.) |
| C0003 | xxxx | RARE | 300 | ..... | 300 | 3 | C (6 SEC.) |
| ⋮ | ⋮ | ⋮ | ⋮ | ⋮ | ⋮ | ⋮ | ⋮ |

Fig. 3

PLAYER INFORMATION

| PLAYER NAME | STAMINA | ACCEPTABLE COST | HP | SETUP CARD INFORMATION | ... |
|---|---|---|---|---|---|
| P | 10 | 20 | TOTAL VALUE OF DEFENSIVE POWERS OF ALL CARDS INCLUDED IN SETUP CARDS | C0001<br>C0002<br>C0003<br>⋮ | ... |

Fig. 4

VIRTUAL CARD GROUP MANAGING INFORMATION

| CARD GROUP NUMBER | TYPE | NAME OF CARD GROUP | AFFILIATION CARD | ... | SELECTE CONDITION |
|---|---|---|---|---|---|
| D101 | MUSIC GENERATION | MALE CHARACTER CARD GROUP | C0001 C0002 ⋮ | ... | SELECTED MUSIC = MALE VOCAL |
| D102 | | FEMALE CHARACTER CARD GROUP | ..... | ... | SELECTED MUSIC = FEMALE VOCAL |
| ⋮ | ⋮ | ⋮ | ⋮ | ⋮ | ⋮ |
| D201 | FREE OF CHARGE | NORMAL CARD GROUP | ..... | ... | FREE OF CHARGE. ⋯ |
| ⋮ | ⋮ | ⋮ | ⋮ | ⋮ | ⋮ |
| D301 | CHARGED | LIMITED-TIME CARD GROUP | ..... | ... | CHARGED. ⋯ |
| ⋮ | ⋮ | ⋮ | ⋮ | ⋮ | ⋮ |

Fig. 5

MUSIC INFORMATION

| MUSIC DATA IDENTIFICATION INFORMATION | ATTRIBUTE INFORMATION | | | |
|---|---|---|---|---|
| | CATEGORY | NAME OF SINGER | GENDER OF VOCAL | ... |
| M0001 | J-POP | xxxx | MALE | ... |
| M0002 | WESTERN MUSIC | xxxx | FEMALE | ... |
| ⋮ | ⋮ | ⋮ | ⋮ | ⋮ |

VIDEO GAME PROCESSING APPARATUS AND VIDEO GAME PROCESSING PROGRAM PRODUCT

CROSS-REFERENCE TO RELATED APPLICATION

The present application relates to subject matter contained in Japanese Patent Application No. 2012-103702, filed on Apr. 27, 2012, the disclosure of which is expressly incorporated herein by reference in its entirety.

BACKGROUND OF THE INVENTION

1. Field of the Invention

The present invention relates to a technique for controlling progress of a video game.

2. Description of the Related Art

Heretofore, in the field of video games, ones that adopt a battle system (a so-called Active Time Battle System, ATB system) are widely known (see Japanese Patent No. 2,794,230). In the ATB system, a video game is controlled so that: a character operated by a player (that is, a player character) and a character operated by a computer or other player (that is, an enemy character) are caused to carry out an attack or the like mutually (or alternately); a time defined for each character from the start of the video game or from the end of termination of an action of each character is measured; and, when the defined time for one character elapses, a processing flow is shifted to a process related to a next action of the character.

Further, heretofore, it is known that, when a player carries out a plurality of actions during progress of a video game, a specific process by combining these actions is carried out. It is commonly known that the combination of a plurality of actions by which such a specific process is carried out is called a "combo". Moreover, a game system (combo system) intended to improve interest of the player in the video game using a concept of "combo" is proposed (see Japanese Patent Application Publication No. 2005-319107).

It has been thought that the ATB system and the combo system (including a system to carry out bonus processing in response to generation of a combo, the same shall apply hereinafter) are combined with each other on the basis of such conditional game systems. However, there has been a problem that the video game lacks interest of the player by simply combining these systems to establish a game system, for example, a game system in which "in a case where defined time elapses and actions instructed for a plurality of player characters become a predetermined combination, a combo is to be established and a bonus is applied to the player (bonus processing is carried out)".

SUMMARY OF THE INVENTION

The present invention has been made in order to solve the problem described above, and it is an object of the present invention to improve interest of a player in a game system provided with an ATB system and a combo system.

In order to achieve the above object, the present invention is directed to a video game processing apparatus for controlling progress of a video game. The video game processing apparatus according to the present invention includes a virtual card information memory for storing virtual card information, the virtual card information being information on virtual cards used for a fighting in the video game, the virtual card information indicating an attack content against an opponent and an attack condition for carrying out the attack content.

The video game processing apparatus also includes a player information memory for storing player information, the player information being information on a player who plays the video game, the player information containing setup virtual card information, the setup virtual card information indicating a setup virtual card set up by the player as a virtual card used for the fighting.

The video game processing apparatus also includes an attack determiner for determining whether or not there is a setup virtual card whose attack condition is satisfied among the setup virtual cards on the basis of a time measured by a timer.

The video game processing apparatus also includes an attack content executor for carrying out the attack content according to the setup virtual card for which the attack determiner determines that its attack condition is satisfied.

In this case, the attack content executor includes a bonus processing executor for carrying out, in a case where there are a plurality of setup virtual cards for which the attack determiner determines that their attack conditions are respectively satisfied within a predetermined time interval, bonus processing according to a combination of the plurality of setup virtual cards.

By configuring the video game processing apparatus as described above, it becomes possible to improve interest of a player in a game system (for example, a video game processing apparatus) provided with an ATB system and a combo system.

In the video game processing apparatus according to the present invention, it is preferable that the video game processing apparatus further includes a fighting screen display controller for causing a display device to display a fighting screen on a display screen of the display device, an enemy character in the fighting and a setup virtual card image being drawn on the fighting screen, the setup virtual card image indicating the setup virtual card, wherein the fighting screen display controller includes a display mode determiner for determining a display mode of the setup virtual card image on the fighting screen on the basis of the time measured by the timer and the attack condition of the setup virtual card.

In the video game processing apparatus according to the present invention, it is preferable that the virtual card information contains: attack representation information for displaying an attack representation on the display screen as part of the attack content; and priority information indicating priority of the attack representation, wherein the attack content executor includes: an attack representation information selector for selecting attack representation information from among plural kinds of attack representation information respectively corresponding to the setup virtual cards on the basis of the priority information, the attack representation information indicating an attack representation to be displayed on the display screen; and an attack representation display controller for displaying the attack representation on the display screen on the basis of the attack representation information selected by the attack representation information selector.

In the video game processing apparatus according to the present invention, it is preferable that the video game processing apparatus further includes an HP calculator for calculating an HP of a player character operated by the player on the basis of the virtual card information.

Moreover, in another aspect of the present invention, the present invention is directed to a video game processing program product for causing a computer to control progress of a video game. In this case, the computer includes: a virtual card information memory for storing virtual card information, the virtual card information being information on virtual cards used for a fighting in the video game, the virtual card information indicating an attack content against an opponent and an attack condition for carrying out the attack content; and a player information memory for storing player information, the player information being information on a player who plays the video game, the player information containing setup virtual card information, the setup virtual card information indicating a setup virtual card set up by the player as a virtual card used for the fighting.

The video game processing program product according to the present invention causes the computer to execute steps including determining whether or not there is a setup virtual card whose attack condition is satisfied among the setup virtual cards on the basis of a time measured by a timer.

The steps also include carrying out the attack content according to the setup virtual card for which it is determined that its attack condition is satisfied.

In this case, in the step of carrying out the attack content, in a case where there are a plurality of setup virtual cards for which it is determined that their attack conditions are respectively satisfied within a predetermined time interval, bonus processing according to a combination of the plurality of setup virtual cards is carried out.

According to the present invention, it is possible to improve interest of a player in a game system (for example, a video game processing apparatus) provided with an ATB system and a combo system.

BRIEF DESCRIPTION OF THE DRAWINGS

The foregoing and other objects, features and advantages of the present invention will become more readily apparent from the following detailed description of a preferred embodiment of the present invention that proceeds with reference to the appending drawings:

FIG. 2 is an explanatory drawing showing an example of a storage state of virtual card information;

FIG. 3 is an explanatory drawing showing an example of a storage state of player information;

FIG. 4 is an explanatory drawing showing an example of a storage state of virtual card group managing information;

FIG. 5 is an explanatory drawing showing an example of a storage state of music information;

DETAILED DESCRIPTION OF THE INVENTION

Hereinafter, an example of one embodiment of the present invention will be described with reference to the appending drawings.

Figure 1:
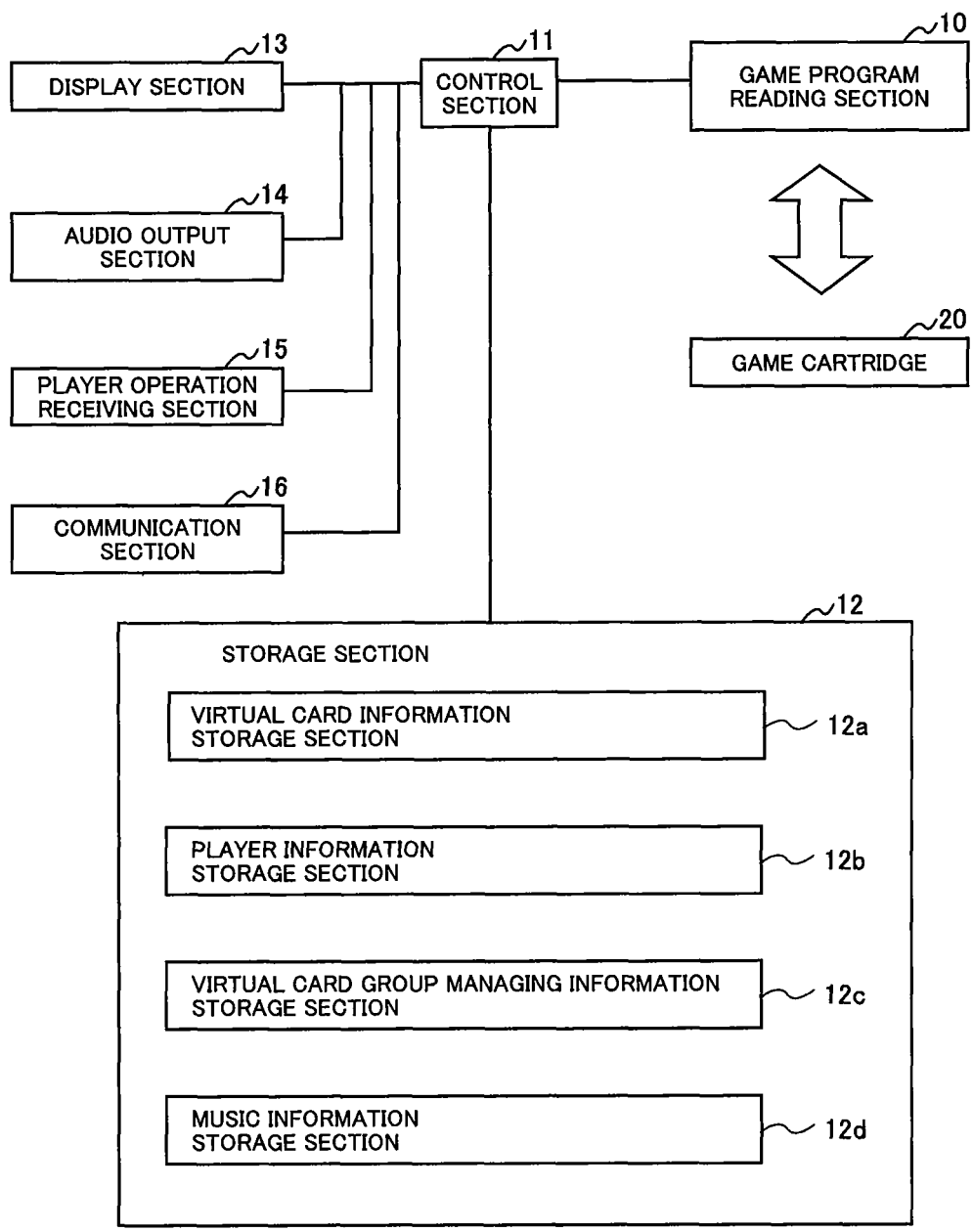
FIG. 1 is a block diagram showing a configuration example of a video game processing apparatus.

FIG. 1 is a block diagram showing a configuration example of a video game processing apparatus 100 according to one embodiment of the present invention. As shown in FIG. 1, the video game processing apparatus 100 includes: a game program reading section 10; a control section 11; a storage section 12; a display section 13; an audio output section 14; a player operation receiving section 15; and a communication section 16.

The game program reading section 10 has a function to read out a necessary video game program from a storage medium in which a storage medium is embedded. Various kinds of video game programs are stored in the storage medium. In this regard, in the present embodiment, the game program reading section 10 has a mounting section into which a game cartridge 20, in which the video game program is stored, is detachably mounted. A player (that is, an operator (or a user) of the video game processing apparatus 100) reads out a video game program from a storage medium of a game cartridge 20 that is mounted into the mounting section, and stores the read-out video game program in the storage section 12. In this regard, the video game carried out in accordance with the video game program used in the present embodiment may be any one so long as the video game is a video game that adopts an ATB system and a combo system.

The control section 11 has a function to carry out the video game program read out by the game program reading section 10 and stored in the storage section 12, and to carry out various kinds of controls for causing a video game to proceed in response to operations by a player.

The storage section 12 is a storage medium for storing video game programs necessary when the video game is caused to proceed and various kinds of data. The storage section 12 is configured by a nonvolatile memory such as a RAM, for example. In the storage section 12, various kinds of information registered and updated in accordance with progress of the video game, and various kinds of information used in the video game, which are read out from the storage medium embedded into the game cartridge 20, are stored.

In this regard, the video game processing apparatus 100 may be configured so that the video game program is downloaded from a video game program providing server (not shown in the drawings) via a communication network such as the Internet or the like and is stored in the storage section 12.

In the present embodiment, the storage section 12 includes: a virtual card information storage section 12a; a player information storage section 12b; a virtual card group managing information storage section 12c; and a music information storage section 12d.

The virtual card information storage section 12a is a storage medium for storing virtual card information. The virtual card information is information on cards (virtual cards) that are used in a fighting in the video game whose progress is controlled by the video game processing apparatus 100. In the video game according to the present embodiment, actual cards do not used. Hereinafter, the virtual card is called a "card".

FIG. 2 is an explanatory drawing showing an example of a storage state of the virtual card information stored in the virtual card information storage section 12a. As shown in FIG. 2, the virtual card information contains: a card number; a card name; rarity; an attack content; a defensive power; a card cost; and a speed.

Here, the "rarity" means scarcity (or rarity) of a card. In the present embodiment, the case where there are "normal" and "rare" as the rarity of each card will be described as an example.

Further, the "attack content" means the content of an attack to be carried out when the card is used in a fighting. In the present embodiment, the attack content contains an offensive power and attack representation information. The offensive power is a value used to calculate a subtracted value of a physical strength value (HP: Hit Point) of an opponent. The attack representation information is information for causing the display device 13 to display a specific game representation (attack representation) on a display screen thereof when a usage condition of a card (attack condition) is satisfied.

Further, the "card cost" is a value used when a card is set up to the player (or a player character). In the present embodiment, a cost (acceptable cost) that can be set up to the player is determined, and the player is required to set up the card in the acceptable cost. In this regard, the video game processing apparatus 100 may be configured so that the acceptable cost varies in accordance with an ability of the player (a player level that changes in accordance with progress of the video game and the like), for example.

Further, the "speed" indicates a value that affects an attack condition of a corresponding card when the corresponding card is used in a fighting. In the present embodiment, the speeds include three steps of speeds (that is, A, B and C). The faster the speed is, the more the number of times attacks according to the card are carried out becomes in a fighting. Details of the fighting will be described later.

In this regard, although it is not shown in the drawings, information indicating a characteristic of the card (that is, characteristic information), such as a gender of a character that is drawn on the card and a category to which the character belongs (for example, a category that establishes a so-called three-way deadlock relationship) is contained in the virtual card information according to the present embodiment.

The player information storage section 12b is a storage medium for storing player information on players who play the video game.

FIG. 3 is an explanatory drawing showing an example of a storage state of the player information stored in the player information storage section 12b. As shown in FIG. 3, the player information contains: a player name; stamina; an acceptable cost; an HP; and setup card information.

Here, the "stamina" is an element necessary to cause the video game to proceed. In the present embodiment, when stamina becomes "zero (0)" in accordance with progress of the video game, the player cannot cause the video game to proceed. The video game processing apparatus 100 then restores the stamina in accordance with a lapse of time. In addition, the video game processing apparatus 100 restores the stamina when a charge operation by the player is received.

Further, the "HP (Hit Point)" indicates a physical strength value of the player. In the present embodiment, the HP is a total value of defensive powers of the cards set up to the player (that is, cards that the player sets up as a card group used for fighting).

Further, the "setup card information" is information indicating a card that is set up as a card that the player uses for a fighting. In the present embodiment, a card number by which a card can be identified uniquely is contained in the setup virtual card information.

The virtual card group managing information storage section 12c is a storage medium for storing virtual card group managing information for managing a virtual card group to which at least one of a plurality of virtual cards belongs. The virtual card group managing information indicates: a plurality of virtual card groups; and selected conditions by which the plurality of virtual card groups are respectively to be selected.

FIG. 4 is an explanatory drawing showing an example of a storage state of the virtual card group managing information stored in the virtual card group managing information storage section 12c. As shown in FIG. 4, the virtual card group managing information contains: a card group number; a type of card group; a name of the card group; affiliation card; and a selected condition.

The kinds of card group according to the present embodiment include music generation, free of charge, and charged. Here, the "music generation" is a card group created on the basis of a concept "can be generated from music freely". The "music generation" is a card group that can be utilized by consuming a virtual ticket, which can be applied to the player in accordance with progress of the video game (particularly, event and the like). Further, the "free of charge" is a card group that can be utilized without charge to the player. Further, the "charged" is a card group that can be utilized by charging the player (for example, in a case where the player consumes a dedicated virtual ticket that can be purchased in the video game).

Further, the "affiliation card" means a card belonging to a card group. The player can acquire, by using the card group, cards of a predetermined number from the cards belonging to the card group at random (or in accordance with a specific rule). In the present embodiment, a card number indicating the card that belongs to the card group is set up to the virtual card group managing information.

Further, the "selected condition" means a condition by which each card group is selected in accordance with progress of the video game. In the present embodiment, the content of the selected condition is different from each other depending upon the card group. In addition, the system of the selected condition is different from each other depending upon the type of card group. Namely, in a case where the type of card group is "music generation", for example, a condition related to the attribute of music data, such as a condition that a selected condition is "a gender of a vocal corresponding to the selected music data is a male", is set up. Further, in a case where the type of card group is "free of charge", the amount of consumption of virtual currency that can be acquired by the player in the video game is set up as the selected condition. moreover, in a case where the type of card group is "charged", the amount of consumption of the charged items is set up as the selected condition.

The music information storage section 12d is a storage medium for storing music information. The music information is information on music data that can be reproduced independently of progress of the video game. The music information contains attribute information indicating an attribute of the music.

FIG. 5 is an explanatory drawing showing an example of a storage state of the music information stored in the music information storage section 12d. As shown in FIG. 5, the music information contains music data identification information and attribute information.

Here, the "music data identification information" is information capable of uniquely identifying the music data. The video game processing apparatus 100 may be configured so that identification information associated with music data in advance is used as the music data identification information, or so that the control section 11 newly applies the music data identification information.

Further, the "attribute information" is information indicating various kinds of attributes regarding music, such as a category, a name of a singer, and a gender of a vocal. The video game processing apparatus 100 may be configured so that the identification information associated with music data in advance is used as the attribute information, or so that the control section 11 newly applies the attribute information. In this regard, as a method of newly applying the music data identification information or the attribute information, it is thought a method of extracting a specific item from music data or a method of receiving an input by the player.

The display section 13 is a display device for displaying the game screen in response to operations by the player in accordance with control by the control section 11. The display section 13 is constructed by a liquid crystal display, for example.

The audio outputting section 14 outputs audio in response to operations by the player and progress of the video game in accordance with control by the control section 11.

The player operation receiving section 15 receives operational signals in response to operations by the player, and notifies the control section 11 of that result. In the present embodiment, the player operation receiving section 15 receives an operation of the player via a touch panel provided on the display section 13. In this regard, the player operation receiving section 15 may be configured so as to receive an operation of the player via a controller such as a mouse and a game pad.

The communication section 16 causes the video game processing apparatus 100 to connect to a communication network such as the Internet by wireless or wired connections, and to transmit and receive various kinds of information.

Next, a fighting in the video game controlled by the video game processing apparatus 100 according to the present embodiment will be described. In the present embodiment, the case where the player carries out a battle against an enemy will be described as an example. However, the fighting is not limited to a "battle" in the sense that players (that is, a player and other player or a computer (opponent) make an attack each other, and may be one in which a victory or defeat is decided using cards.

Figure 6:
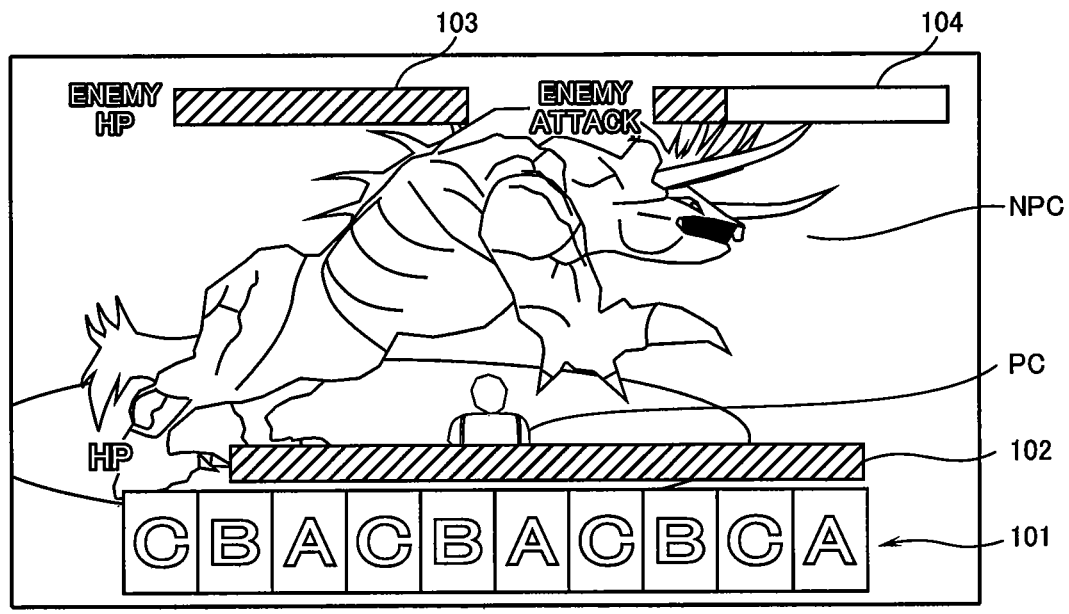
FIG. 6 is an explanatory drawing showing an example of a fighting screen.

FIG. 6 is an explanatory drawing showing an example of a fighting screen. As shown in FIG. 6, a card display region 101 in which cards used for a fighting are displayed; a HP gauge 102 in which an HP of the player is indicated; an enemy character HP gauge 103 in which an HP of an enemy character NPC that is an opponent is indicated; and an enemy attack gauge 104 in which a time until an attack by the enemy character NPC is to be carried out is indicated; are provided on the fighting screen according to the present embodiment. Further, in the present embodiment, a player character PC that is a character operated by the player is also displayed on the fighting screen.

As shown in FIG. 6, ten cards are displayed in the card display region 101. Here, a picture of each of the cards, in which virtual card information is indicated, is essentially displayed in the card display region 100. However, in order to facilitate explanation of a method of using cards in a fighting, FIG. 6 shows symbols (A, B, C) each indicating a speed of a card. In this regard, the display mode of the card is not limited to this mode. The display mode of the card may be a display form so that the player can recognize the card to be used for a fighting. Further, the video game processing apparatus 100 may be configured so that a region for displaying cards of the opponent is provided on the fighting screen.

In the video game according to the present embodiment, an attack content corresponding to the card whose attack condition is satisfied is carried out whenever the attack condition set up to each card is satisfied (more specifically, whenever the time according to the speed elapses). Further, an attack to be carried out by an enemy side is also carried out when the time according to the speed set up to the enemy character elapses. The enemy attack gauge 104 is changed in accordance with the elapsed time.

A result of the fighting is determined when the HP of either the player or the enemy becomes "0". In this regard, states of the each other's HPs are indicated by the HP gauge 102 and the enemy character HP gauge 103.

In the fighting, a combo bonus is determined on the basis of the number of cards attacks are carried out at the same timing. The more the number of combos is (that is, the more cards whose attack conditions are satisfied at the same timing are, the more the combo bonus is increased. As the content of the combo bonus, it is thought various kind of content, such as an increase in an offensive power of each of the cards, acquisition of a predetermined item and the like.

Figure 7:
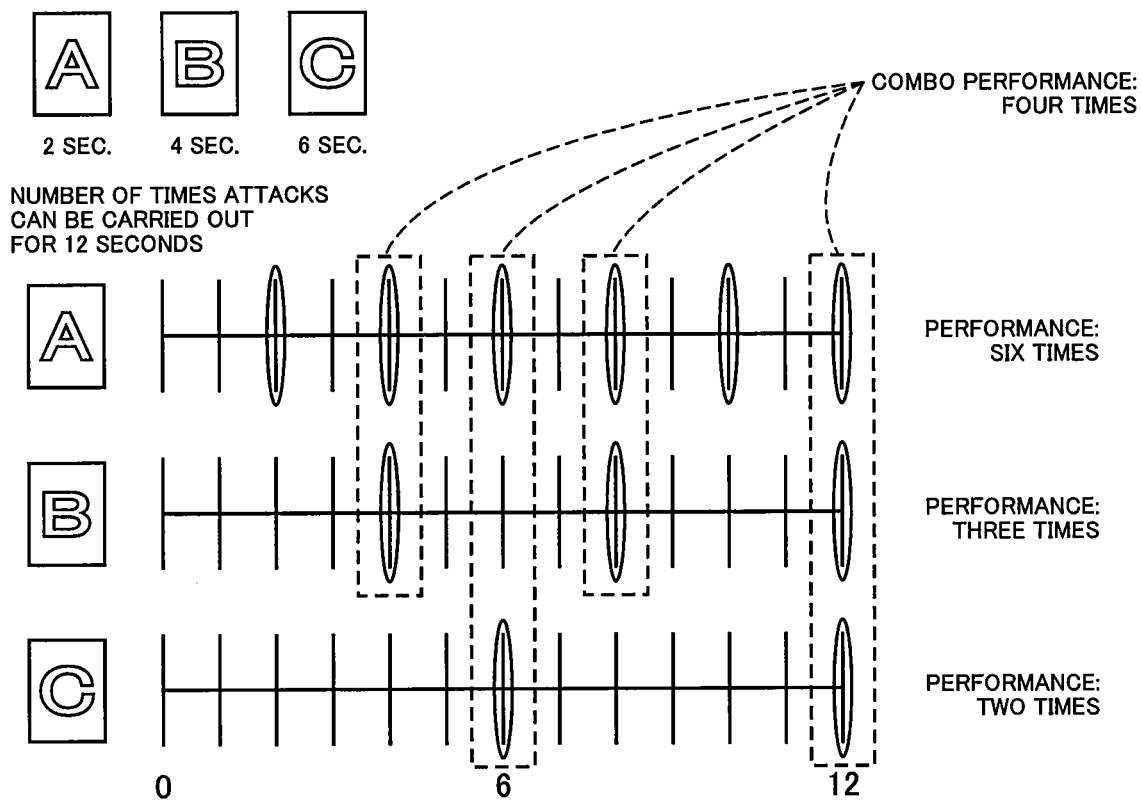
FIG. 7 is an explanatory drawing for explaining a method of using a card in a fight.

FIG. 7 is an explanatory drawing for explaining a method of using a card in a fight. Here, as shown in FIG. 7, the case where cards with three different kinds of speed are used will be described as an example. In a case where the types of cards used for a fighting are cards whose speed is "two seconds" (card A), cards whose speed is "four seconds" (card B) and cards whose speed is "six seconds" (card C), as shown in FIG. 7, for twelve seconds from the start of the fighting (more specifically, since measurement of time until an attack is started), an attack corresponding to the card A is performed six times, an attack corresponding to the card B is performed thrice (three times), and an attack corresponding to the card C is performed twice (two times). Further, during this period, combos are performed four times (that is, a combo by the card A and the card B is performed two times, a combo by the card A and the card C is performed once (one time), and a combo by the card A, the card B and the card C is performed once).

In this regard, as shown in FIG. 6, in a case where the card group selected in advance by the player as cards used for the fighting is configured by three cards A, three cards B and four cards C, a combo of only cards of the same type is not to be performed. However, for example, in a case where two cards A and one card B satisfy the respective attack conditions at the same timing, a combo different from the combo when the attack conditions of one card A and one card B are satisfied at the same timing is to be performed. In this regard, a method of performing a combo is not limited to these methods. For example, the video game processing apparatus 100 may be configured so that a combo by only the same type of cards is performed. Further, the video game processing apparatus 100 may be configured so that, in a case where the attack conditions of two cards A and one card B are satisfied at the same timing, the combo by one card A and one card B is performed and the attack corresponding to one card A is performed once in addition to the combo.

Next, an operation of the video game processing apparatus 100 according to the present embodiment will be described.

Figure 8:
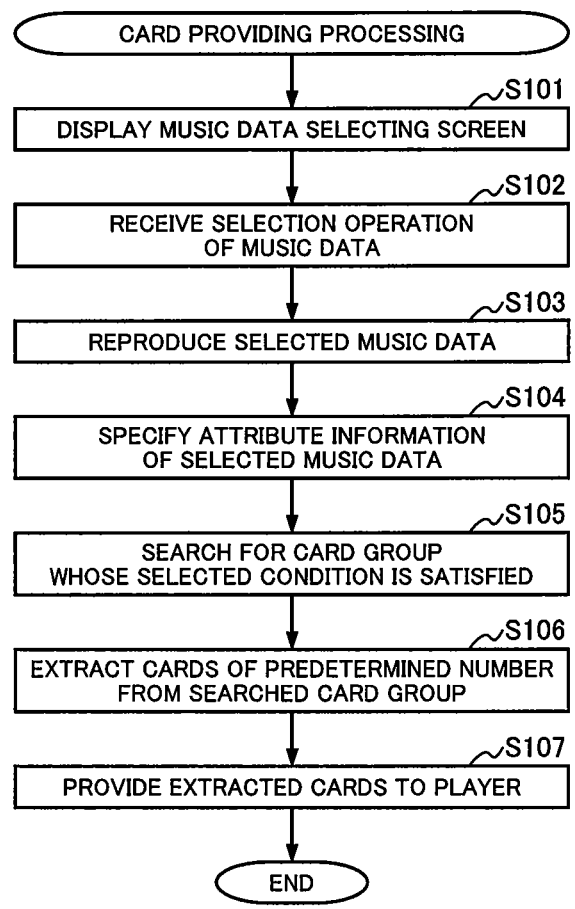
FIG. 8 is a flowchart showing an example of card providing processing.

FIG. 8 is a flowchart showing an example of card providing processing carried out by the video game processing apparatus 100. In the card providing processing, processing to provide a card to the player is carried out. In this regard, the content of processing with no relationship to the present invention may be omitted.

The card providing processing is started when a predetermined card providing condition is satisfied in accordance with progress of the video game, for example. In the present embodiment, the case where the card providing processing is started when the control section 11 receives a consumption operation of a virtual ticket by a player A who is a user of the video game processing apparatus 100 will be described as an example.

In the card providing processing, the control section 11 first refers to the music information stored in the music information storage section 12*d*, and causes the display section 13 to display a music data selecting screen (not shown in the drawings) on the display screen of the display section 13 (Step S101). The music data selecting screen may be configured so as to capable of receiving a selection operation of music data by the player. However, the music data selecting screen does not always have to be configured so as to capable of selecting the music data. Namely, music names may be selectably displayed on the music data selecting screen. Alternatively, a button for receiving a request to carry out a process to select music data may be displayed at random (or in accordance with a specific selection rule) on the music data selecting screen. Hereinafter, in the present embodiment, the case where a screen on which titles of songs indicating music data are selectably displayed on the display screen as the music data selecting screen will be described as an example.

When the music data selecting screen is displayed, the control section 11 receives a selection operation of music data (Step S102). In the present embodiment, the control section 11 receives a touch operation to the titles of songs displayed on the music data selecting screen as a selection operation of the music data.

When the selection operation of music data is received, the control section 11 reproduces the selected music data (Step S103). In this regard, the video game processing apparatus 100 may be configured so that the control section 11 reproduces the music data from beginning to end at this time. Alternatively, the video game processing apparatus 100 may be configured so that the control section 11 reproduces only a beginning part or a hook (or a hook-line) of the music data.

After reproduction of the music data (during reproduction or after the end of reproduction), the control section 11 refers to the music information stored in the music information storage section 12d, and specifies attribute information of the selected music data (that is, music data during reproduction or music data that has been reproduced) (Step S104). In the present embodiment, the control section 11 specifies the music data identification information indicating the selected music data, and searches for the attribute information associated with the specified music data identification information, whereby the attribute information of the selected music data is specified.

When the attribute information is specified, the control section 11 searches for a card group whose selected condition is satisfied by selecting music data (Step S105). In this regard, in the present embodiment, in a case where there are a plurality of card groups whose selected conditions are respectively satisfied on the basis of the content indicated by the attribute information of the selected music data, the control section 11 causes the display section 13 to selectably display the plurality of card groups, and receives a selection operation of a card group by the player A. Further, for example, in a case where attribute information of the selected music data does not indicate anything, or in a case where there is no card group whose selected condition is satisfied in the content indicated by the attribute information, the control section 11 sets up a predetermined card group to a card group whose selected condition is satisfied.

When the card group whose selected condition is satisfied is searched for by selecting the music data, the control section 11 extracts cards of a predetermined number from the searched card group (Step S106). In the present embodiment, the control section 11 extracts one card among the cards belonging to the card group at random.

When the cards of the predetermined number are extracted from the card group, the control section 11 provides the extracted cards to the player A (Step S107), and terminated the processing herein. In the present embodiment, the control section 11 updates the player information so as to add the card number indicating the extracted card to possessed cards.

Figure 9:
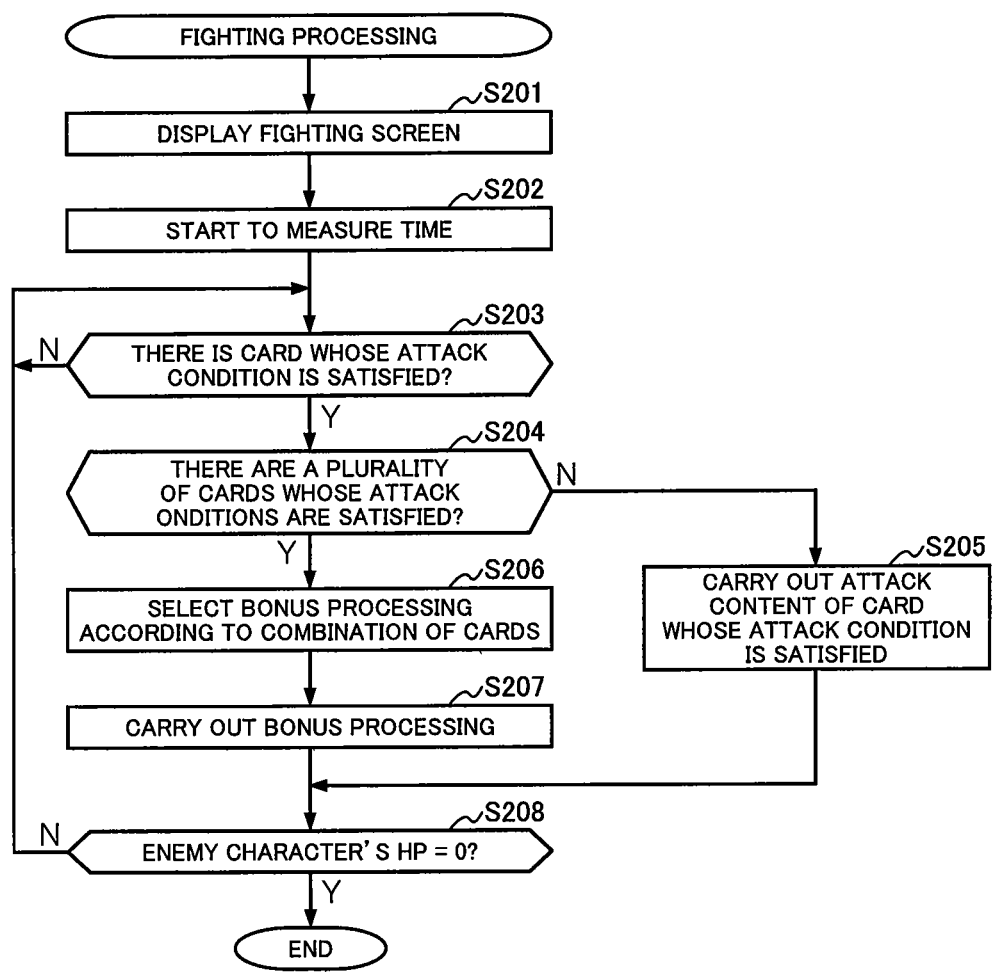
FIG. 9 is a flowchart showing an example of fighting processing.

FIG. 9 is a flowchart showing an example of fighting processing carried out by the video game processing apparatus 100. In the fighting processing, processing to carry out a fighting using cards is carried out. In this regard, the content of processing with no relationship to the present invention may be omitted.

The fighting processing is started when a battle condition between the player (or a player character operated by the player) and an enemy character is satisfied in accordance with progress of the video game, for example. Hereinafter, the case where a battle between the player character PC operated by the player A who is a user of the video game processing apparatus 100 and the enemy character NPC controlled by the control section 11 is carried out will be described as an example.

In the fighting processing, the control section 11 first causes the display section 13 to display a fighting screen on the display screen (Step S201).

Figure 10:
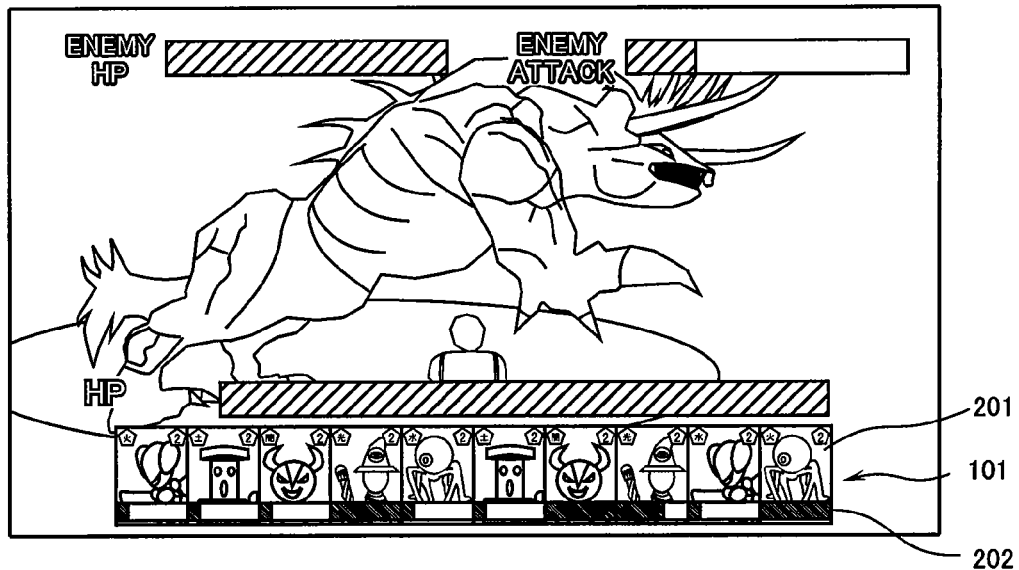
FIG. 10 is an explanatory drawing for explaining an example of the fighting screen.

FIG. 10 is an explanatory drawing for explaining an example of the fighting screen. Here, differences between the fighting screen shown in FIG. 6 and the fighting screen shown in FIG. 10 will be described. In this regard, cards to which different speeds are set up are displayed in the card display region 101 in FIG. 6 and FIG. 10.

As shown in FIG. 10, a plurality of cards 201 in each of which an illustration is drawn and a plurality of speed gauges 202 respectively corresponding to the plurality of cards 201 are displayed in the card display region 101 on the fighting screen. In this regard, it is preferable that a picture indicating a level of a card and/or a category thereof is drawn as the illustration in addition to a character corresponding to the card and a virtual item.

Here, the "speed gauge" is a gauge indicating a remaining time until an attack condition of each card is satisfied. The "speed gauge" is filled up in accordance with a lapse of time, and becomes empty when the attack content according to the card is carried out. Namely, a time according to a speed set up to one card until the attack content of the same card is carried out after the attack content of the card has been carried out.

When the fighting screen is displayed, the control section 11 starts to measure a time in order to determine whether to satisfy an attack condition of the card displayed in the card display region 101 or not (Step S202).

When the measuring time is started, the control section 11 determines whether or not there is a card whose attack condition is satisfied among the cards displayed in the card display region 101 (Step S203). In the present embodiment, the control section 11 determines that there is a card whose attack condition is satisfied in a case where there is a card whose speed gauge is filled up (that is, a card for which the time setup as the speed elapses from start of the fighting or since the attack content has been carried out once).

Here, in a case where it is determined that there is a card whose attack condition is satisfied ("Yes" at Step S203), the control section 11 determines whether or not there are a plurality of cards whose attack conditions are respectively satisfied (Step S204). In the present embodiment, the control section 11 determines whether there are a plurality of cards whose attack conditions are respectively satisfied at the same timing (within a predetermined time interval) or not on the basis of a time measured by a time measuring section (that is, a timer; not shown in the drawings). The time measuring section measures a time on the second time scale. In this regard, the video game processing apparatus 100 may be configured so that as the determination herein, the control section 11 determines whether there are a plurality of cards whose attack conditions are respectively satisfied within the predetermined time interval or not. For example, the video game processing apparatus 100 may also be configured so that the player is allowed to set up the predetermined time interval.

Here, in a case where it is determined that there are not the plurality of cards whose attack conditions are respectively satisfied ("No" at Step S204), the control section 11 carries out the attack content of the card whose attack condition is satisfied (Step S205), and causes the processing flow to shift to a process at Step S208 (will be described later).

On the other hand, in a case where it is determined that there are the plurality of cards whose attack conditions are respectively satisfied ("Yes" at Step S204), the control section 11 selects bonus processing according to a combination of the plurality of cards as the combo bonus (Step S206). In the present embodiment, the control section 11 refers to bonus information, and selects bonus processing corresponding to the combination of the plurality of cards whose attack conditions are respectively satisfied. The bonus information is information in which various kinds of bonus processings such as an increase in an offensive power and restoration of an HP are respectively associated with combinations of a plurality of cards. In this regard, although it is not shown in the drawings, the bonus information is stored at a predetermined storage region in the storage section 12. In this regard, it is preferable that the video game processing apparatus 100 is configured so that the bonus processing is useful for the player as the number of cards whose attack conditions are satisfied at the same timing becomes larger (that is, as the number of combos becomes larger).

When the bonus processing is selected, the control section 11 carries out the selected bonus processing (Step S208).

When the bonus processing is carried out, the control section 11 determines whether or not the HP of the enemy character becomes a predetermined value or lower (in the present embodiment, "0") (Step S208). Here, in a case where it is determined that the HP does not become the predetermined value or lower ("No" at Step S208), the control section 11 causes the processing flow to shift to the process at Step S203.

On the other hand, in a case where it is determined that the HP becomes predetermined value or lower ("Yes" at Step S208), the control section 11 terminated the processing herein.

As explained above, in the embodiment described above, the video game processing apparatus 100 for controlling progress of the video game is configured so as to: include the virtual card information storage section 12a for storing the virtual card information, the virtual card information being information on the virtual cards used for a fighting in the video game, the virtual card information indicating an attack content against an opponent and an attack condition (for example, the speed) for carrying out the attack content; include the player information storage section 12b for storing player information, the player information being information on a player who plays the video game, the player information containing setup virtual card information (for example, the setup card information in FIG. 3), the setup virtual card information indicating a setup virtual card set up by the player as a virtual card used for the fighting; determine whether or not there is a setup virtual card whose attack condition is satisfied (for example, the card for which the time according to the speed elapses) among the setup virtual cards (for example, the cards displayed in the card display region 101) on the basis of the time measured by the time measuring section (timer) (for example, Step S204); carry out the attack content according to the setup virtual card for which it is determined that its attack condition is satisfied; and carry out, in a case where there are a plurality of setup virtual cards for which it is determined that their attack conditions are respectively satisfied within a predetermined time interval, bonus processing according to a combination of the plurality of setup virtual cards (for example, Step S207). Therefore, it is possible to improve interest of the player in the game system provided with an ATB system and a combo system.

Namely, in the video game that adopts a battle system in which a fighting situation is varied in accordance with a lapse of time, by providing to the player an opportunity to consider an element different from an input of a command, it becomes possible to improve interest of the player in the video game.

Further, by establishing a combination of cards used in the fighting (deck) while considering the attack condition (for example, the time required to carry out an attack, that is, the speed in the present embodiment) including a temporal element set up to each virtual card, the player can change a fighting result. Therefore, it becomes possible to improve interest of the player in the video game.

In this regard, although it has not been mentioned particularly in the embodiment described above, in place of the attack content (or in addition to the attack content), the action content regarding the fighting, such as a defense content and a restoration content, may be set up to the virtual card information. Further, the video game processing apparatus 100 may be configured so that a plurality of conditions are also set up to the attack condition (or action condition).

Further, in the embodiment described above, the video game processing apparatus 100 may be configured so as to cause the fighting to proceed after start of the fighting without requesting an instruction by the player. Therefore, it becomes possible to improve convenience of the player on the video game. Namely, since an operation to input a command or the like is not required after start of the fighting, the player can cause the fighting to proceed even during movement or in the intervals of other works. However, the video game processing apparatus 100 may be configured so as to require an instruction by the player such as an instruction regarding usage of an item in the video game, for example, in order to cause the fighting to proceed.

In this regard, although it has not been mentioned particularly in the embodiment described above, the video game processing apparatus 100 may be configured so as to: cause the display device (for example, the display section 13) to display the fighting screen (see FIG. 10) on the display screen of the display device, the enemy character NPC in the fighting and the setup virtual card image indicating the setup virtual card being drawn on the fighting screen (for example, Step S201); and determine a display mode of the setup virtual card image in the fighting screen on the basis of the time measured by the time measuring section (the timer) and the attack condition (for example, the speed) of the setup virtual card. Namely, for example, the video game processing apparatus 100 may be configured so as to display the cards gradually sharply as the time until the attack condition is satisfied becomes shorter in accordance with a lapse of time. By configuring the video game processing apparatus 100 in this manner, it is possible to display the fighting screen by which the player can grasp a fighting status (fighting situation) intuitively. In this regard, a change in the display mode of the setup virtual card image according to the elapsed time is not limited particularly so long as it is configured so that the player can recognize that the attack condition corresponding to the setup virtual card is satisfied in accordance with a lapse of time. Further, in a case where the video game processing apparatus 100 is configured in this manner, the video game processing apparatus 100 may be configured so as to store information required for the change (display mode determining information) in the storage section 12, for example.

In this regard, although it has not been mentioned particularly in the embodiment described above, the video game processing apparatus 100 carries out, when to carry out the attack content of the card whose attack condition is satisfied, an attack representation indicated by the attack representation information contained in the virtual card information, such as a representation in which the card whose attack condition is satisfied becomes a photon ball with a color according to the type of the card (for example, a category thus set up) and is sucked into a weapon of the player character on the fighting screen, for example. In this regard, when to carry out the bonus processing, the video game processing apparatus 100 determines whether to carry out the attack representation indicated by the attack representation information corresponding to each of the virtual cards in accordance with the content of the selected bonus processing or not. Moreover, the video game processing apparatus 100 may be configured so that, with respect to the attack representation, the virtual card information contains the attack representation information for displaying the attack representation on the display screen as part of the attack content and the priority information indicating a priority of the attack representation, and the video game processing apparatus 100 may be configured so as to: select the attack representation information indicating the attack representation to be displayed on the display screen on the basis of the priority information from among plural kinds of attack representation information respectively corresponding to the setup virtual cards (for example, the cards displayed in the card display region 101); and cause the display section 13 to display the attack representation on the display screen on the basis of the selected attack representation information. By configuring the video game processing apparatus 100 in this manner, it becomes possible to shorten the fighting time by displaying only the flashiest portion of the attack representation, for example. In this regard, in a case where there are plural kinds of attack representation information corresponding to one virtual card (for example, in a case where there are two kinds of attack representation information that are divided into an introduction stage and an execution stage of the attack), the video game processing apparatus 100 may be configured so that priority information is associated with each kind of attack representation information (or each divided one of attack representation information); and the video game processing apparatus 100 may be configured so as to: select the attack representation information (or divided attack representation information) from the respective setup virtual cards whose attack conditions are satisfied on the basis of the priority information; and cause the display section 13 to display the attack representation on the display screen on the basis of the selected attack representation information.

In this regard, although it has not been mentioned particularly in the embodiment described above, the video game processing apparatus 100 may be configured so as to: receive a skip instruction from the player by receiving a tap operation toward the display screen at the fighting, for example; generate skip screen information indicating a skip screen (that is, a screen on which a dedicated representation for skip is displayed) for informing the player of the content of fighting in a different form from the fighting screen in a case where the skip instruction is received; and cause the display section 13 to display the generated skip screen on the display screen.

Figure 11:
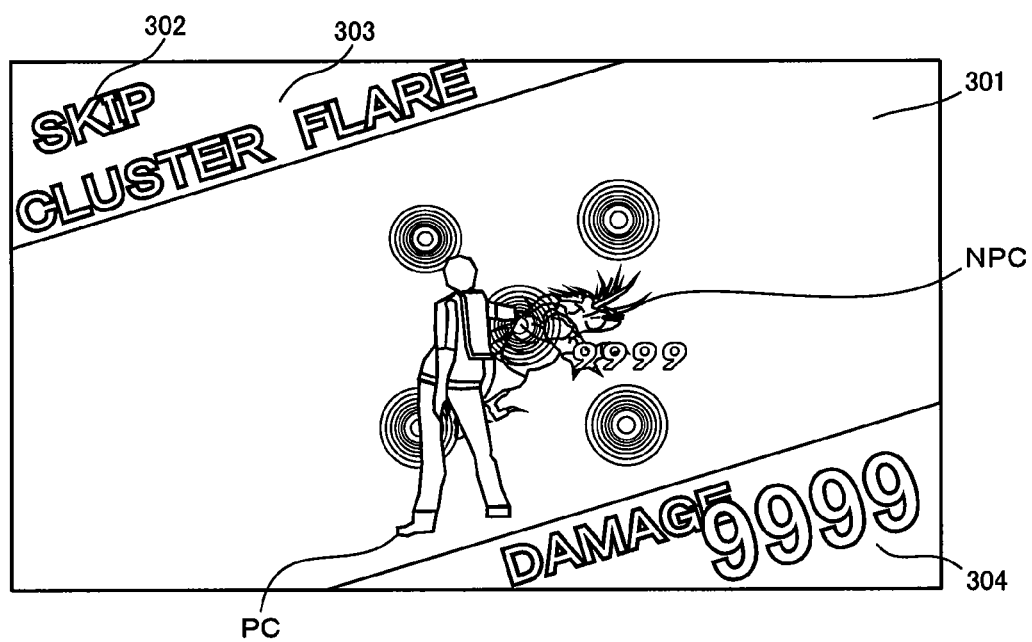
FIG. 11 is an explanatory drawing showing an example of a skip screen.

FIG. 11 is an explanatory drawing showing an example of the skip screen. As shown in FIG. 11, an attack representation display region 301 in which an attack representation is displayed; a skip screen informing region 302 for informing the player that the screen is now the skip screen; an attack name display region 303 in which an attack name according to the attack representation is displayed; and a damage value display region 304 in which a damage value applied to the enemy character NPC by means of the attack corresponding to the attack representation (that is, a reduced value of the HP of the enemy character NPC) is displayed; are provided on the skip screen. In this regard, the video game processing apparatus 100 may be configured so as to select, in accordance with a predetermined selection rule, the attack representation displayed in the attack representation display region 301, such as only an attack representation of the virtual card with the highest offensive power or an attack representation according to the attack content in which the HP of the enemy character NPC is set to "0" when to carry out a normal fighting, for example. Thus, by inserting a dedicated representation for skip and inserting a representation special to tempo up (pace up) and skip, it is possible to improve no less interest of the player in the video game using the skip than a normal battle.

Further, in the embodiment described above, the video game processing apparatus 100 may be configured so as to calculate the HP of the player character PC operated by the player on the basis of the virtual card information (for example, calculate a total value of defensive powers of all cards included in the setup cards as the HP). Therefore, it is possible to increase considerable elements when the player sets up a virtual card used for a fighting, and this makes it possible to further improve interest of the player in the video game.

In this regard, although it has not been mentioned particularly in the embodiment described above, the video game processing apparatus 100 may be configured so as to: communicate with other video game processing apparatus for controlling progress of the same video game; and allow other player to participate in the fighting carried out by the own user (for example, the player A). Namely, for example, the video game processing apparatus 100 may be configured so that only cards of a predetermined number (for example, three) of other player can be included in the cards used in the fighting by the player A. By configuring the video game processing apparatus 100 in this manner, it is possible to enhance (or heighten) an element (or aspect) as a social card game. In this regard, in this case, the video game processing apparatus 100 may be configured so that, when attack conditions of a card of other player and a card of the player are satisfied at the same timing, carry out bonus processing different from the bonus processing to be carried out when attack conditions of the cards of only the player are satisfied at the same timing.

In this regard, in the embodiment described above, the video game processing apparatus 100 is configured so as to carry out various kinds of processings such as the game processing described above on the basis of the video game program read out from the game cartridge 20. However, the video game processing apparatus 100 may be configured so as to acquire the video game program via the communication network such as the Internet. Further, the video game processing apparatus 100 may be configured so as to function as a video game server to provide the video game program to a video game terminal via the communication network.

Further, in the embodiment described above, the video game processing apparatus 100 carries out the various kinds of processes described above in accordance with various kinds of control programs (for example, the video game processing program product) stored in a storage device (the storage section 12) with which the video game processing apparatus 100 itself is provided.

INDUSTRIAL APPLICABILITY

The present invention is useful to improve interest of a player in a game system provided with an ATB system and a combo system.

What is claimed is:

1. A video game processing apparatus for controlling progress of a video game, the video game processing apparatus comprising:
    a virtual card information memory for storing virtual card information, the virtual card information being information on virtual cards used for fighting in the video game, each of the virtual cards indicating an attack content against an opponent and an attack condition for carrying out the attack content, the attack condition including a timing;
    a player information memory for storing player information, the player information being information on a player who plays the video game, the player information containing setup virtual card information, the setup virtual card information indicating a virtual card set of the virtual cards, the virtual card set being set up by the player to be used for the fighting;
    an attack determiner for determining whether there is at least one setup virtual card whose attack condition is satisfied among the virtual card set on the basis of a time measured by a timer, the attack condition being satisfied when the timing of the attack condition corresponds to the time measured by the timer; and
    an attack content executor for carrying out the attack content according to each of the at least one setup virtual card for which the attack determiner determines that the attack condition is satisfied,
    wherein the attack content executor includes a bonus processing executor for carrying out, in a case where there are a plurality of setup virtual cards for which the attack determiner determines that the attack condition of each of the plurality of setup virtual cards is satisfied within a predetermined time interval, bonus processing according to a combination of the plurality of setup virtual cards.

2. The video game processing apparatus according to claim 1, further comprising:
    a fighting screen display controller for causing a display device to display a fighting screen on a display screen of the display device, an enemy character in the fighting and a setup virtual card image being drawn on the fighting screen, the setup virtual card image indicating the virtual card set,
    wherein the fighting screen display controller includes a display mode determiner for determining a display mode of the setup virtual card image on the fighting screen on the basis of the time measured by the timer and the attack condition of the virtual cards of the virtual card set.

3. The video game processing apparatus according to claim 1, wherein the virtual card information contains:
    attack representation information for displaying an attack representation on the display screen as part of the attack content; and
    priority information indicating priority of the attack representation,
    wherein the attack content executor includes:
        an attack representation information selector for selecting attack representation information from among plural kinds of attack representation information respectively corresponding to the setup virtual cards on the basis of the priority information, the attack representation information indicating an attack representation to be displayed on the display screen; and
        an attack representation display controller for displaying the attack representation on the display screen on the basis of the attack representation information selected by the attack representation information selector.

4. The video game processing apparatus according to claim 1, further comprising:
    a hit-point calculator for calculating a hit-point of a player character operated by the player on the basis of the virtual card information.

5. The video game processing apparatus according to claim 1, wherein the attack content executor carries out the bonus processing when the attack determiner determines that the attack condition of each of the plurality of setup virtual cards is satisfied at a same timing.

6. The video game processing apparatus according to claim 5, wherein the attack determiner measures the time for a predetermined period from a start of the fighting.

7. The video game processing apparatus according to claim 6, wherein, for each virtual setup card, the attack determiner determines that the attack condition is satisfied when the time measured from the start of the fighting corresponds to the timing included in the attack condition.

8. The video game processing apparatus according to claim 7, wherein, for each virtual setup card, the timing included in the attack condition is configured to reset after the attack determiner determines that the attack condition is satisfied.

9. The video game processing apparatus according to claim 8, wherein, for each virtual setup card, the attack condition is continuously satisfied after being reset for the duration of the predetermined period when the time measured by the timer corresponds to the timing.

10. The video game processing apparatus according to claim 9, wherein at least one of the setup virtual cards is configured to be satisfied at the same timing, with different ones of the setup virtual cards at different times.

11. The video game processing apparatus according to claim 5, wherein at least one of the setup virtual cards is configured to be satisfied at the same timing, with different ones of the setup virtual cards at different times.

12. The video game processing apparatus according to claim 1, further comprising:
    a network communication interface that downloads the video game from a video game program providing server via a communication network.

13. A non-transitory computer-readable medium including a video game processing program product for causing a computer to control progress of a video game, wherein the computer comprises:
    a virtual card information memory for storing virtual card information, the virtual card information being information on virtual cards used for fighting in the video game, each of the virtual cards indicating an attack content against an opponent and an attack condition for carrying out the attack content, the attack condition including a timing;
    a player information memory for storing player information, the player information being information on a player who plays the video game, the player information containing setup virtual card information, the setup virtual card information indicating a virtual card set of the virtual cards, the virtual card set being set up by the player to be used for the fighting,
    wherein the video game processing program product causes the computer to execute:

determining whether there is at least one setup virtual card whose attack condition is satisfied among the virtual card set on the basis of a time measured by a timer, the attack condition being satisfied when the timing of the attack condition corresponds to the time measured by the timer; and carrying out the attack content according to each of the at least one setup virtual card for which it is determined that the attack condition is satisfied, wherein in the carrying out the attack content, in a case where there are a plurality of setup virtual cards for which it is determined that the attack condition of each of the plurality of setup virtual cards is satisfied within a predetermined time interval, bonus processing according to a combination of the plurality of setup virtual cards is carried out.

14. The non-transitory computer-readable medium according to claim 13, wherein the bonus processing is carried out when the attack condition of each of the plurality of setup virtual cards is satisfied at a same timing.

15. The non-transitory computer-readable medium according to claim 14, wherein the time is measured for a predetermined period from a start of the fighting.

16. The non-transitory computer-readable medium according to claim 15, wherein, for each virtual setup card, the attack condition is satisfied when the time measured from the start of the fighting corresponds to the timing included in the attack condition.

17. The non-transitory computer-readable medium according to claim 16, wherein, for each virtual setup card, the timing included in the attack condition is configured to reset after the attack condition is satisfied.

18. The non-transitory computer-readable medium according to claim 17, wherein, for each virtual setup card, the attack condition is continuously satisfied after being reset for the duration of the predetermined period when the time measured by the timer corresponds to the timing.

19. The non-transitory computer-readable medium according to claim 18, wherein at least one of the setup virtual cards is configured to be satisfied at the same timing, with different ones of the setup virtual cards at different times.

20. The non-transitory computer-readable medium according to claim 14, wherein at least one of the setup virtual cards is configured to be satisfied at the same timing, with different ones of the setup virtual cards at different times.

* * * * *